United States Patent [19]

Hung

[11] Patent Number: 4,602,083

[45] Date of Patent: Jul. 22, 1986

[54] COAGULATION PROCESS

[75] Inventor: Ju-Ming Hung, Holland, Pa.

[73] Assignee: Rohm and Haas Company, Philadelphia, Pa.

[21] Appl. No.: 690,227

[22] Filed: Jan. 10, 1985

[51] Int. Cl.$^4$ ............................................... C08F 6/22
[52] U.S. Cl. .................................... 528/488; 528/487; 528/485; 526/329.7
[58] Field of Search ....................... 528/485, 487, 488

[56] References Cited

U.S. PATENT DOCUMENTS 3,245,970  4/1966  Drayer .................................. 528/485
4,103,074  7/1978  Hertel .................................. 528/488
4,429,114  1/1984  Sugimori ............................. 528/488

Primary Examiner—Paul R. Michl
Attorney, Agent, or Firm—Jordan J. Driks

[57] ABSTRACT

A process for the coagulation of an aqueous polymer latex comprises contacting the aqueous polymer latex with an effective amount of an aqueous solution of a water soluble non-nucleophilic, non-oxidative salt of an alkaline earth metal and removing the coagulated polymer from the aqueous medium. The polymer prepared by the process has a unique combination of properties.

22 Claims, No Drawings

COAGULATION PROCESS

BACKGROUND OF THE INVENTION

This invention is directed to a process for the coagulation of an aqueous polymer latex. More specifically, this invention concerns a process, as aforesaid, wherein an aqueous polymer latex is contacted with an effective amount of a coagulant which is an aqueous solution of a water soluble non-nucleophilic, non-oxidative salt of an alkaline earth metal. This invention also concerns polymers prepared by the process.

Coagulation of a polymer latex is well known. For example, U.S. Pat. No. 3,751,527 is directed to the blending of two polymers, which may be the same polymer or different polymers, in an extruder. U.S. Pat. No. 3,751,527 teaches that a coagulant solution may be composed of any of a number of salts such as sodium chloride, and polyvalent metal salts such as calcium chloride, aluminum chloride or aluminum sulfate. The disclosure of U.S. Pat. No. 3,751,527 is incorporated herein by reference.

U.S. Pat. No. 2,516,980 discloses incorporating, into a synthetic hydroxylated polymer, a minor amount by weight of a hypophosphorous acid compound to reduce discoloration of a hydroxylated polymer at elevated temperature. Among the compounds which the U.S. Pat. No. 2,516,980 teaches incorporating into a solution of the hydroxylated polymer are sodium hypophosphite, as well as the ammonium and alkali and alkaline metal salts such as potassium, calcium, magnesium, barium and ammonium hypophosphites. This patent fails to teach the use of an alkaline earth metal salt, contemplated herein, for coagulating a polymer latex and instead is directed to treating a polymer solution or a polymer fabric, yarn or film.

U.S. Pat. No. 2,548,974 is directed to a method of making rubbery articles which are deposited directly from an aqueous dispersion of rubber-like material. The U.S. Pat. No. 2,548,974 patent teaches that a method for making rubbery deposition articles includes a method for leaching coagulant from a rubbery coagulum deposit in a short time without introducing a large amount of water into the deposit. The U.S. Pat. No. 2,548,974 exposes a coagulum deposit to water vapor and teaches that an aqueous coagulant-containing liquid accumulates between the article and a suitably shaped form. The coagulants which may be leached in accordance with the teachings of the U.S. Pat. No. 2,548,974 are water soluble polyvalent metal salts of inorganic or organic acids such as calcium nitrate or of water soluble ionizable acids such as acetic acid. The U.S. Pat. No. 2,548,974 fails to teach or suggest any of the novel coagulants used herein.

U.S. Pat. No. 2,576,720 is directed to the granular polymerization of a material such as methyl methacrylate in order to obtain the polymer in granular form. Also disclosed is the granular polymerization of styrene and vinyl acetate. The U.S. Pat. No. 2,576,720 teaches the use of sodium or potassium hypophosphite as an anti-clustering agent in preparing the aforesaid polymers. By the term clustering, the U.S. Pat. No. 2,576,720 sets forth that what is meant is the agglomeration of fine polymer granules to form aggregates of larger and widely varying sizes. The U.S. Pat. No. 2,576,720 fails to teach or suggest the invention described herein.

U.S. Pat. No. 3,896,093 is directed to a process for the recovery of polymers of acrylonitrile and styrene and optionally, butadiene, by coagulation of aqueous latices containing these polymers. The U.S. Pat. No. 3,896,093 teaches that coagulants such as hydrochloric acid, sulfuric acid, formic acid, and water soluble salts of chlorides, nitrates, sulfates and acetates of sodium, potassium, calcium, magnesium, zinc, and aluminum may be used as the coagulants. The U.S. Pat. No. 3,896,093 does not teach the use of non-nucleophilic, non-oxidative coagulants.

U.S. Pat. No. 3,915,909 is directed to a process for isolating rubbers from their aqueous dispersions (latices). The process involves adding an alkyl cellulose or a hydroxyalkyl cellulose to an aqueous rubber dispersion and adding a water soluble alkali metal salt or alkaline earth metal salt, aluminum salt or zinc salt to the dispersion. None of the salts which are added are non-nucleophilic and non-oxidative.

U.S. Pat. No. 3,160,620 is directed to the coagulation of chloroprene polymer latices and isolation of the polymer therefrom. The U.S. Pat. No. 3,160,620 teaches that the aqueous coagulating solution contains a water soluble calcium salt and hydroxyethyl cellulose and a water soluble salt of a water insoluble carboxylic acid. The U.S. Pat. No. 3,160,620 teaches that all of the three components, set forth above, are necessary to obtain the benefits of the U.S. Pat. No. 3,160,620. The U.S. Pat. No. 3,160,620 teaches the use of coagulants such as a water soluble calcium salt which may be the nitrate, chloride, bromide, thiocyanate, and acetate. The U.S. Pat. No. 3,160,620 fails to teach or suggest a non-nucleophilic, non-oxidative coagulant and a polymer obtained thereby.

All of the prior art processes, which utilize coagulants to coagulate a polymer from a polymer latex, suffered from the disadvantage that the very nature of the prior art coagulants served to introduce additional precipitating additives to a material which already contained residues from emulsifier, polymerization initiator, and other components which, although necessary to the process, also served to introduce contaminants into the final polymer and thus into articles prepared from the final polymer. These diluents or contaminants have an adverse effect on polymer properties and on articles made from the resultant polymer. It was not possible, until the present invention, to prepare polymers and articles fabricated therefrom which have a unique combination of water haze properties, yellowness index properties and light transmission properties.

It is an object of this invention therefore to provide a process for the coagulation of a polymer latex.

Another object of this invention is to provide a process for the coagulation of a polymer latex wherein residual coagulant does not substantially affect the properties of the polymer obtained therefrom.

A still further object of this invention is to provide a clear transparent solid polymeric article which has a combination of enhanced properties of water haze value, yellowness index and light transmission.

Other objects and advantages will become apparent from the following more complete description and claims.

SUMMARY OF THE INVENTION

Broadly, this invention contemplates a process for the coagulation of an aqueous polymer latex comprising contacting the aqueous polymer latex with an effective amount of an aqueous solution of a water soluble non-nucleophilic, non-oxidative salt of an alkaline earth metal and removing the coagulated polymer from the aqueous medium.

This invention also contemplates a poly(methyl methacrylate) polymer or copolymer thereof, prepared by the aforesaid process in an extruder and a clear transparent solid polymeric article which has a water haze value of less than about 15 percent, a yellowness index of less than about +4, and a percent light transmission of at least about 88%.

It was surprising to find that a non-nucleophilic, non-oxidative salt of an alkaline earth metal would not only be effective in coagulating a polymer latex but would result in a polymer product which has a novel combination of a range of properties as regards color, water haze resistance, and percent light transmission.

DETAILED DESCRIPTION

As used in the specification and claims, the term "salt of an alkaline earth metal" means a salt of either calcium, barium, strontium, magnesium, or zinc. Although zinc may normally not be classified as an alkaline earth metal, it is included in the definition for purposes of simplicity.

The terms "acrylic polymer", "methacrylic polymer", "styrenic polymer", and "vinyl polymer", as used in the specification and claims includes copolymers of the above with one another as well as with other monomers and includes in the case of "acrylic polymer" a polymer which is predominately derived from a monomer which may be an ester of acrylic acid such as a butyl acrylate, ethyl acrylate, 2-ethylhexylacrylate, benzyl acrylate and the like. The term "methacrylic polymer" includes a polymer prepared from a monomer which is an ester of methacrylic acid such as methyl methacrylate, isobornyl methacrylate, cyclohexyl methacrylate and the like. The term "styrenic polymer" includes a polymer derived from styrene, alphamethylstyrene, para-methylstyrene, chlorostyrene and the like. The term "vinyl polymer", as used in the specification and claims, means a polymer derived from vinyl chloride, vinylidene chloride, vinyl acetate, and the like.

In practicing the process of this invention to prepare the novel polymers of this invention, one may use either a batch process or a continuous process for coagulation such as would be used with a devolatizing extruder in which the coagulated polymer latex is advanced towards an exit by a rotating screw or pair(s) of screws.

Regardless of whether a batch or continuous process is used, the process involves adding a coagulant solution to a polymer latex thereby coagulating the polymer. Water and water soluble impurities are removed from the coagulated medium and the polymer may thereafter be washed and dried.

Generally speaking, the coagulant solution which is used is an aqueous solution of a water soluble non-nucleophilic, non-oxidative salt of an alkaline earth metal.

The term "non-nucleophilic" as used herein, means that the coagulant will not act to attack, in any manner so as to adversely affect, an electrophilic species. (See J. March, *Advanced Organic Chemistry*, second edition, McGraw-Hill, 1977, page 322, for a further description of nucleophilic attack.) Among the nucleophilic anions which should be avoided in practicing this invention may be mentioned those derived from chlorine, bromine, iodine, acetate and other carboxylates and the like. Although salts of such nucleophilic anions are capable of coagulating a polymer latex, such nucleophilic salts are incapable of coagulating a polymer latex to yield a polymer having the unique properties which are exhibited by polymers of the present invention.

The coagulants useful in this invention are non-nucleophilic, non-oxidative divalent metal salts, such as a divalent metal salt of hypophosphorus acid.

Suitable non-nucleophilic, non-oxidative anions which may be combined with an alkaline earth metal cation to form the salts useful in this invention are the hypophosphite, the trifluoromethanesulfonate, trifluoroacetate, methanesulfonate, and the like.

The cation of the coagulant salt may be that derived from any alkaline earth metal such as calcium, barium, strontium, magnesium and zinc and the like.

Among the water soluble non-nucleophilic, non-oxidative salts which may be used in practicing the invention are calcium hypophosphite, zinc hypophosphite, calcium methanesulfonate, zinc methanesulfonate, barium hypophosphite, strontium hypophosphite, calcium trifluoroacetate, calcium trifluoromethanesulfonate, and the like.

Whichever coagulant salt of this invention is used, the salts must be water soluble, i.e., must be at least 0.1% soluble in water by weight at 25° C. and atmospheric pressure. If the salt which is used does not have at least that minimum degree of solubility, then the salt will not be effective as a coagulant of this invention because it will not produce the desired result. It is preferred, for reasons of convenience and economics, to use an aqueous solution of a coagulant wherein the concentration of coagulant is from about 0.1% to about 10%, by weight, based on the weight of the entire coagulant solution.

Although the solution of coagulant has been referred to as an aqueous solution, the coagulant solvent may be composed wholly of water or may contain a cosolvent such as an alcohol, e.g., ethyl alcohol. Any other cosolvent may be used which will not adversely affect the desired degree of concentration of the coagulant in the solvent system and wherein the cosolvent does not have an adverse affect on either the operation of the coagulant or on the polymer or its properties. Thus, in addition to alcohol, one may use a cosolvent or mixture of cosolvents such as acetone, tetrahydrofuran, and the like.

The amount of coagulant solution used to coagulate the polymer may vary widely. The amount of coagulant solution used will depend upon the concentration of the coagulant in the solution, the composition of the polymer latex being coagulated, and the conditions, such as temperature, pressure and shear rate, under which the coagulation takes place.

The coagulant is used in an effective amount which generally will vary from about 0.05% to about 5% based on the weight of the polymer solids in the latex.

One may readily determine the amount of coagulant solution to be used with any particular polymer latex by, for a given set of conditions under which the polymer latex is being processed and the coagulant is added, titrating the coagulant solution into a known volume of a sample of the polymer latex until the desired degree of coagulation has been obtained, such as would be indicated by the disappearance of white water, which indicates that a sufficient amount of coagulant has been added. Normally, an excess of coagulant is used when coagulating a polymer latex.

When one coagulates a polymer latex which is composed of primarily poly(methyl methacrylate) or poly(butyl acrylate), containing 30% to 60% solids, and which may contain a small amount of a comonomer such as ethyl acrylate, one may use from about 5 liters of a 0.3% coagulant solution such as calcium hypophosphite, for each 3 liters of polymer latex at conditions such as 85° C., at atmospheric pressure.

The pH of the coagulant solution is not critical and may vary widely. The only caveat is that the pH of the coagulant solution must be compatible with the pH of the polymer latex. Typically, a polymer latex will be at a pH of between about 3 to about 7.5. If the coagulant solution has a pH which varies widely from the desired pH of the polymer latex, then the pH of the coagulant solution may be adjusted with an appropriate base or acid so that the desired pH of the polymer latex will not be adversely affected with the resultant disadvantage of obtaining less desirable properties such as color.

When preparing a polymer latex, one method for such preparation is to add water and an emulsifier to a reaction vessel and to agitate the water-emulsifier dispersion vigorously. Thereafter, monomer or monomers (depending on whether a homopolymer or copolymer is to be prepared) is then added and agitation is continued. Thereafter, an initiator is added and polymerization subsequently begins, either with or without the application of heat. Polymerization is then deemed completed when the desired amount of monomer has reacted. The polymer latex may be prepared by either batch or continuous methods and such other methods are well known in the art.

Any emulsifier may be used for preparing the polymer latex such as an alkali salt of an aryl, alkyl or alkaryl sulfonic acid or sulfate. Specific examples of such materials are sodium or potassium dodecylbenzene-sulfonate, sodium lauryl sulfate, sodium laurylsulfonate, and the like. Other emulsifiers which may be used are an alkali salt of a dialkyl sulfosuccinate, such as sodium dioctyl sulfosuccinate, sodium oleate, and the like.

The initator which may be used to prepare a polymer latex may be a sodium, potassium, or ammonium salt of a peracid, such as sodium persulfate and the like. Other initiators which may be used include a redox type of initiator such as sodium persulfate/sodium formaldehyde sulfoxylate, cumene hydroperoxide/sodium metabisulfite, potassium persulfate/sodium hyposulfite, and the like.

The choice of initiator and emulsifier is dependent upon factors such as the chemical composition of the polymer latex being prepared, emulsion stability, rate of polymerization, thermal stability of the resultant polymer in the latex, compatability of the coagulant salt with the initiator or initiator decomposition product and the like. For example, one would not use a sodium persulfate initiator when the coagulant salt is barium hypophosphite because the initiator residue would react with the barium hypophosphite to convert the barium hypophosphite to barium sulfate which is not water soluble and is not soluble in the polymer. Thus, the initiator used should not leave a residue which would react with the coagulant salt to render it water or polymer insoluble.

Other components may also be present in the emulsion system from which the polymer latex is derived. These other components may include agents to control molecular weight, such as an alkyl mercaptan, a thermal stabilizer, an anti-oxidant, an ultra-violet stabilizer, and the like. Such other components which may be added and the amounts thereof will be apparent to one skilled in the art and the invention is not to be construed as limited to any particular method of preparing a polymer latex or to any additional components which may be added to the system when preparing a polymer latex.

This invention may be used to prepare a wide variety of polymers from a polymer latex wherein the polymers prepared thereby have a unique combination of properties. Thus, impact modifiers for plastic materials may be prepared by the process of this invention. Such impact modifiers may include methacrylate-butadiene-styrene modifiers; acrylonitrile-butadiene-styrene modifiers, multistage acrylic-methacrylic modifiers, for example poly(butyl acrylate) as a core material and poly(methyl methacrylate) as a shell or intermediate stage. Other stages may also be present.

More specifically, among the polymers with which the present invention may be used to prepare the polymer from the polymer latex are polymers of alkyl methacrylates having 1-22 carbon atoms in the alkyl portion, more preferably 1-4 carbon atoms in the alkyl portion, and particularly methyl methacrylate; copolymers of alkyl methacrylates with styrenic monomers, vinyl monomers, acrylic monomers, methacrylic monomers, acrylonitrile, and the like, in which the alkyl methacrylate predominates on a weight basis; polymers of alkyl acrylates having 1-22 carbon atoms in the alkyl portion, particularly those having 1-12 carbon atoms in the alkyl portion, such as n-butyl acrylate, ethyl acrylate, 2-ethylhexyl acrylate, and the like; copolymers of alkyl acrylates with styrenic monomers, vinyl monomers, methacrylic monomers, acrylonitrile, diene monomers such as butadiene, and the like, in which the alkyl acrylate predominates on a weight basis; polymers of styrenic monomers, such as polystyrene and the like; copolymers of styrenic monomers with acrylic monomers, acrylonitrile, methacrylic monomers, and the like, in which the styrenic monomer predominates on a weight basis; terpolymers of styrenic monomer and dienic monomers with a third monomer, such as acrylonitrile-butadiene-styrene polymers; and the like.

Small amounts of functional monomers may be incorporated into the polymer latices used with the present invention; such monomers may include those with acid functionality, such as itaconic acid, acrylic acid, sodium styrene sulfonate, and the like; crosslinking monomers, such as alkylene diacrylates, divinylbenzene, and the like; monomers useful in chemical post-cures, such as chloroethyl acrylate, methylol methacrylamide, and the like; graft-linking monomers, such as allyl methacrylate, diallyl maleate and the like.

The present invention is particularly useful when preparing a staged polymer. By the term staged polymer is meant a polymer which may have a core of, for example, poly(butyl acrylate), polybutadiene, poly(methyl methacrylate) and the like, or various copolymers. A second stage may be composed of the same or dissimilar polymers and there may be one or more subsequent stages. Any one or more of the stages may have a crosslinker or graftlinker or both present.

Such a staged polymer may generally be prepared by preparing a polymer latex, and then emulsion polymerizing a second monomer or mixture of monomers in the presence of the previously prepared polymer latex. The second monomer or monomer mixture will polymerize and form a layer (stage) over the previously prepared polymer particles of the latex. This process may be repeated numerous times until the desired number of stages of the same or different polymer composition have been achieved.

Any of the additives normally present when preparing a polymer latex may also be present in any or all of the various stages. One may even prepare several stages where the polymers differ from one another only in molecular weight but are compositionally the same. This may be done by adding an alkyl mercaptan when polymerizing a monomer which is the same as the monomer of a previously prepared stage which was not prepared using an alkyl mercaptan.

In a particularly preferred embodiment of this invention, the process may be practiced as is set forth in U.S. Pat. No. 3,751,527 wherein an apparatus is used which has means for advancing a liquid-bearing or a liquid-containing polymerized material such as a polymer latex, along a channel. Means is also provided for feeding the liquid containing material into the channel and means is provided to heat the channel and its contents, if desired. Means is further provided for introducing a coagulant into the material as it is fed into the channel or in the vicinity of its entry into the channel. Dewatering means and liquid discharge means are provided along the channel. Also provided are devolatilization means and means to control the pressure exerted upon the coagulated polymer system as it proceeds through a zone of the channel which embraces the entry and discharge means.

Thus, in practicing the present invention in a manner set forth in U.S. Pat. No. 3,751,527, the liquid containing polymer latex would be introduced into the extruder and a coagulant solution would be added to the latex in the extruder at a point at or near the point of entry of the latex. Thereafter, heat, sufficient to fuse the coagulated polymer, may be applied, depending upon the latex employed. The latex would be coagulated by the coagulant solution while being advanced through the channel toward the dewatering zone, the devolatilization zone and then to an exit where it would be expelled. The pressure exerted upon the coagulated polymer system as it proceeds through the channel is maintained in order to express the liquid from the coagulated latex, which liquid would also contain residues from the initiator, emulsifier and other materials which may have been added when preparing the polymer latex.

In a particularly preferred embodiment, the extruder is equipped with at least one pair of screws. The number of pairs of screws which is present in the extruder is dictated solely by economic and practical process considerations.

In an even more preferred embodiment of this invention, each screw number of each pair of screws which is present in the extruder rotates in a direction counter to the rotational direction of the other screw member of the pair. In this manner, mixing and expulsion of water and water soluble materials from the coagulated latex is enhanced.

It was particuarly surprising that when a poly(methyl methacrylate) latex is coagulated in an extruder, a clear transparent solid polymeric article would exhibit a unique combination of properties which are water haze value, yellowness index and percent light transmission. Such a unqiue combination of properties is also obtained with copolymers of methyl methacrylate with, for example, ethyl acrylate, butyl acrylate, styrene, alpha-methylstyrene, acrylonitrile and the like.

It is preferred that when the polymer latex is a copolymer of methyl methacrylate, the methyl methacrylate be present in an amount of at least about 50% based on the weight of the monomers charged.

Although the unique combination of properties are obtained with poly(methyl methacrylate) or a copolymer thereof when the process of this invention is practised using an extruder as aforedescribed, other polymers or copolymers will also experience an alteration of a combination of their properties when the process of this invention is practiced in an extruder such as the one described in U.S. Pat. No. 3,751,527, although other types of extruders may also be used.

Although the above method is preferred, the process of this invention may be utilized in a batch or continuous process or in an extruder other than the extruder described above.

In the Examples set forth below, the yellowness index was determined according to the test set forth in ASTM D1925. Initial haze and water haze were determined according to the test method described in ASTM D1003. Percent light transmission was determined by ASTM Test Method D1746.

The various polymer latices which are used in the Examples are prepared by standard means, known to one skilled in the art and the invention is not to be construed as limited to any method of preparing a polymer latex.

In the Examples which follow, unless otherwise specified, all parts and percentages are parts and percentages by weight based on the amount of monomer(s) present except that the amount of coagulant salt used is based on the polymer solids present in the latex.

In order to more fully illustrate the nature of this invention and the manner of practicing the same, the following Examples are presented.

EXAMPLE 1

A latex emulsion containing a copolymer of 96 parts methyl methacrylate and 4 parts of ethyl acrylate had been previously prepared using 0.35 part of potassium dodecyl benzene sulfonate, 0.06 part of potassium persulfate, 0.48 part of tertiary-dodecylmercaptan and 100 parts of water. The resultant polymer latex contains 50%, by weight, of solids. The reaction is conducted under nitrogen at 85° C. for a period of 120 minutes.

40 parts of the latex prepared as described above are introduced into the coagulation zone of an extruder having a coagulation zone, a dewatering zone, and a devolatization zone. The coagulation zone temperature is 50° C. to 170° C. The coagulation zone is heated by injecting high pressure steam into the polymer latex. The dewatering zone and the devolatization zone are heated by a combination of shear and supplying external heat to the screw barrel walls. The extruder has two counter rotating 0.8 inch diameter screws disposed tangential to one another through its center and through the coagulation zone, dewatering zone and the devolatization zone. A 2% aqueous solution of calcium hypophosphite (0.1 part by weight on a coagulant salt/polymer solids basis) and 14 parts of steam are injected into the coagulation zone. Coagulation commences immediately and the coagulated polymer, with the volatiles and water and various water solutions present are passed into the dewatering zone which is at a temperature of 180° C. to 200° C. The back pressure in the dewatering zone is 150 psig. The water expressed from the coagulated latex is then expelled through an outlet in the dewatering zone. The polymer then passes to a devolatization zone which reaches a temperature of 270° C. In the devolatization zone, volatile materials are expelled through an outlet. The polymer then proceeds along the channel to an exit and is expelled as a strand, cooled and cut into pellets.

The resulting polymer pellets are dried at 60° C. for 12 hours and then are injection molded into 2 inch by 3 inch by ⅛ inch thick clear transparent plaques. The yellowness index, initial haze, percent light transmission, and water haze (24 hours at 70° C.) are then determined on the plaques. The results are as follows:

| | |
|---|---|
| Yellowness index = | +2.7 |
| Initial Haze = | 3.1 |
| Water Haze (24 hrs. at 70° C.) = | 3.3 |
| Percent Light Transmission Through Sample = | 89.8% |

EXAMPLE 2

The procedure of Example 1 is repeated except that dipotassium hydrogen phosphate is used.
The results are as follows:

TABLE I

| Coagulant | Amount of Coagulant (Salt Based on Amt. of Polymer Solids) | Yellowness Index | Initial Haze | Water Haze (24 hrs at 70° C.) | Percent Light Transmission Through Sample |
|---|---|---|---|---|---|
| Dipotassium Hydrogen Phosphate | 2.6 | +3.2 | 6.7 | 100 | 86.9 |

As is shown by the above Example and Example 1, the process according to this invention results in a superior polymeric article.

EXAMPLE 3

A series of polymer latices are prepared in the manner of Example 1. Different emulsifiers are used for each preparation. The amount of emulsifier used is 0.35%. The emulsifiers used are as follows:

TABLE II

| Example | Emulsifier Used |
|---|---|
| 3a | disodium dodecyldiphenylether disulfonate |
| 3b | potassium dodecylbenzenesulfonate |
| 3c | sodium dioctylsulfosuccinate |

3 liters of polymer latex is added to a 10 l. stainless steel beaker in which there is present 5 liters of water at 85° C., and 0.33 part of the coagulant of Example 1. The beaker is equipped with an air driven stirrer. The mixture is then stirred for ten minutes and filtered. A portion of the wet cake is washed three times with 85° C. deionized water and is then dried under vacuum at 60° C. The remaining portion of the wet cake is not washed with water and is treated differently and is not reported. The washed samples are then molded into plaques, as described in Example 1 and the yellowness index, initial haze and water haze (24 hours at 70° C.) and percent light transmission is determined. Table III sets forth the results.

TABLE III

| Example | Yellowness Index | Initial Haze | Water Haze (24 hrs at 70° C.) | Percent Light Transmission Through Sample |
|---|---|---|---|---|
| 3a | +2.6 | 5.6 | 6.4 | 92.4 |
| 3b | +1.3 | 3.6 | 4.2 | 93.2 |
| 3c | +3.2 | 5.5 | 5.7 | 91.5 |

EXAMPLE 4

110 parts of a latex prepared as in Example 1 and containing 50% solids, is mixed with 82.4% parts of a latex* of a multistage polymer containing 51% solids, and 6.4 parts of another latex** of a staged polymer. The latices are blended with one another and the blend is then divided into 4 portions and each portion is coagulated with a different coagulant, according to the process of Example 1. The polymers are formed into plaques in the manner of Example 1 and the properties of the plaques are determined.

| | | |
|---|---|---|
| *latex | first stage prepared from | 33.5 parts methyl methacrylate |
| | | 1.4 parts ethyl acrylate |
| | | 0.07 part allyl methacrylate |
| | | 85.3 parts water |
| | in the presence of | 0.135 part potassium dodecylbenzenesulfonate |
| | | 0.021 part potassium persulfate |
| | second stage prepared from | 36.3 parts butyl acrylate |
| | | 7.9 parts styrene |
| | | 0.9 part allyl methacrylate |
| | | 6.4 parts water |
| | in the presence of | 0.044 part potassium persulfate |
| | | 0.176 part potassium dodecylbenzenesulfonate |
| | third stage prepared from | 19.2 parts methyl methacrylate |
| | | 0.8 part ethyl acrylate |
| | | 6.3 parts water |
| | in the presence of | 0.0120 part potassium persulfate |
| **latex | first stage prepared from | 10.0 parts ethyl acrylate |
| | | 15.0 parts methyl methacrylate |
| | | 112.8 parts water |
| | in the presence of | 0.40 part sodium lauryl sulfate |
| | | 0.012 part potassium persulfate |
| | | 0.01 part sodium hyposulfite |
| | second stage prepared from | 75.0 parts methyl methacrylate |
| | | 0.010 part potassium persulfate |

Each stage is polymerized, in the manner of Example 1, in the presence of the polymerized preceding stage or stages.
Each stage is prepared in the manner of Example 1, and the second stage is polymerized in the presence of the first stage.

The coagulants used and the results are as follows:

TABLE IV

| Coagulant | Amount of Coagulant (Salt Based on Amt. of Polymer Solids) | Yellowness Index | Initial Haze | Water Haze (24 hrs at 70° C.) | Percent Light Transmission Through Sample |
|---|---|---|---|---|---|
| Calcium Hypophosphite | 0.10 | +3.1 | 4.9 | 6.8 | 90.3 |

TABLE IV-continued

| Coagulant | Amount of Coagulant (Salt Based on Amt. of Polymer Solids) | Yellowness Index | Initial Haze | Water Haze (24 hrs at 70° C.) | Percent Light Transmission Through Sample |
| --- | --- | --- | --- | --- | --- |
| Magnesium Hypophosphite | 0.10 | +3.3 | 4.1 | 12.2 | 89.9 |
| Calcium* Acetate | 0.16 | +6.2 | 4.0 | 6.1 | 88.4 |
| Dipotassium* Hydrogen Phosphate | 2.8 | +3.2 | 3.8 | 92.4 | 91.0 |

*Comparative

EXAMPLE 5

250 parts of a polymer latex prepared from 74 parts of methyl methacrylate, 24 parts of alpha-methylstyrene, 2 parts of ethyl acrylate, 150 parts water, 0.3 part n-dodecyl mercaptan, 0.39 part sodium dodecylbenzene-sulfonate and 0.13 part sodium persulfate, is prepared in the manner of Example 1 and is coagulated in accordance with the procedure of Example 1 using the coagulant of Example 1. The resultant polymer is then molded into plaques as in Example 1. The yellowness index, initial haze and water haze are then determined as is percent light transmission. The results are as follows:

TABLE V

| Coagulant | Amount of Coagulant (Salt Based on Amt. of Polymer Solids) | Yellowness Index | Initial Haze | Water Haze (24 hrs at 70° C.) | Percent Light Transmission Through Sample |
| --- | --- | --- | --- | --- | --- |
| Calcium Hypophosphite | 0.38 | +1.3 | 1.1 | 1.1 | 92.9 |

EXAMPLE 6

The procedure of Example 4 is repeated except that the blended latices are divided into 6 portions. Each portion is coagulated with a different coagulant salt and molded into plaques as in Example 1. The results are as follows:

TABLE VI

| Coagulant | Amount of Coagulant (Salt Based on Amt. of Polyer Solids) | Yellowness Index | Initial Haze | Water Haze (24 hrs at 70° C.) | Percent Light Transmission Through Sample |
| --- | --- | --- | --- | --- | --- |
| Calcium acetate (comparative) | 0.16 | +8.8 | 12.9 | 14.1 | 89.6 |
| Calcium hypophosphite | 0.16 | +3.3 | 5.1 | 6.2 | 90.8 |
| Calcium trifluoroacetate | 0.16 | +2.6 | 4.0 | 5.5 | 92.3 |
| Calcium methanesulfonate | 0.16 | +3.0 | 4.2 | 6.8 | 92.1 |
| Calcium trifluoromethane-sulfonate | 0.15 | +3.2 | 4.9 | 6.0 | 91.6 |
| Zinc hypophosphite | 0.19 | +2.6 | 5.0 | 6.9 | 91.9 |

While this invention has been described in terms of certain preferred embodiments and illustrated by means of specific Examples, the invention is not to be construed as limited except as set forth in the following claims.

I claim:

1. A process for the coagulation of an aqueous polymer latex comprising contacting the aqueous polymer latex with an effective amount of an aqueous solution of a water soluble non-nucleophilic, non-oxidative salt of an alkaline earth metal and removing the coagulated polymer from the aqueous medium.

2. A process according to claim 1 wherein said effective amount is from about 0.05% to about 5% based on the amount of latex polymer solids.

3. A process according to claim 1 wherein said salt is present in said aqueous solution in a concentration of from about 0.1% to about 10% by weight.

4. A process according to claim 1 wherein said polymer is an acrylic polymer.

5. A process according to claim 1 wherein said polymer is a methacrylic polymer.

6. A process according to claim 1 wherein said polymer is a styrenic polymer.

7. A process according to claim 1 wherein said polymer is a vinyl polymer.

8. A process according to claim 1 wherein said polymer is a copolymer.

9. A process according to claim 1 wherein said salt is calcium hypophosphite.

10. A process according to claim 1 wherein said salt is zinc hypophosphite.

11. A process according to claim 1 wherein said salt is magnesium hypophosphite.

12. A process according to claim 1 wherein said salt is calcium methanesulfonate.

13. A process according to claim 1 wherein said salt is a divalent metal salt of hypophosphorus acid.

14. A process according to claim 1 wherein said aqueous polymer latex is prepared by polymerizing an additional monomer in the presence of a polymer latex of at least one other monomer.

15. A process according to claim 1 wherein said aqueous polymer latex is conveyed into an extruder having a screw and said aqueous solution of said salt is added to said latex in said extruder and the screw of said extruder advances said coagulated polymer through a channel toward an exit from said extruder.

16. A process according to claim 15 wherein said screw of said extruder is rotating when said polymer latex is conveyed into contact with said screw and when said aqueous solution of said salt is added and said screw advances said coagulated polymer toward an exit from said extruder.

17. A process according to claim 16 wherein said extruder contains at least one pair of screws, each member of said pair rotating in a direction counter to the rotational direction of the other member.

18. A process according to claim 1 wherein said polymer latex is a blend of at least two polymer latices.

19. A process according to claim 1 wherein said polymer latex is a blend of (a) a polymer latex comprising poly(methyl methacrylate), plus (b) a polymer latex of a staged polymer wherein the staged polymer has a first stage which comprises poly(methyl methacrylate), a second stage which comprises a copolymer of butyl acrylate and styrene, and a third stage which comprises poly(methyl methacrylate), plus (c) a polymer latex of a staged polymer wherein the staged polymer has a first stage comprising a copolymer of methyl methacrylate and ethyl acrylate and a second stage comprising poly(methyl methacrylate).

20. A process according to claim 19 wherein said first stage of (b) comprises a copolymer of methyl methacrylate and ethyl acrylate.

21. A process according to claim 19 wherein said third stage of (b) comprises a copolymer of methyl methacrylate and ethyl acrylate.

22. A process according to claim 1 wherein said polymer latex is a blend of (a) a polymer latex comprising a copolymer of methyl methacrylate and ethyl acrylate, plus (b) a polymer latex of a staged polymer wherein the staged polymer has a first stage which comprises a copolymer of methyl methacrylate and ethyl acrylate, a second stage which comprises a copolymer of butyl acrylate and styrene, and a third stage which comprises a copolymer of methyl methacylate and ethyl acrylate, plus (c) a polymer latex of a staged polymer wherein the staged polymer has a first stage comprising a copolymer of methyl methacrylate and ethyl acrylate and a second stage comprising poly(methyl methacrylate).

* * * * *